(12) United States Patent
Mazeev et al.

(10) Patent No.: US 8,436,815 B2
(45) Date of Patent: May 7, 2013

(54) SELECTIVE ENABLING OF MULTI-INPUT CONTROLS

(75) Inventors: Maxim Mazeev, Redmond, WA (US); Scot Anderson, Issaquah, WA (US); John Weiss, Lake Forest Park, WA (US); Robert Levy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 11/904,189

(22) Filed: Sep. 26, 2007

(65) Prior Publication Data

US 2008/0291174 A1 Nov. 27, 2008

Related U.S. Application Data

(60) Provisional application No. 60/931,710, filed on May 25, 2007.

(51) Int. Cl.
*G06F 3/041* (2006.01)
(52) U.S. Cl.
USPC .................. 345/173; 345/619; 345/645
(58) Field of Classification Search .................. None
See application file for complete search history.

(56) References Cited

U.S. PATENT DOCUMENTS

| | | | |
|---|---|---|---|
| 5,933,134 A * | 8/1999 | Shieh .......................... | 345/173 |
| 6,003,041 A | 12/1999 | Wugofski | |
| 6,199,195 B1 * | 3/2001 | Goodwin et al. ............. | 717/104 |
| 6,204,837 B1 * | 3/2001 | Smith .......................... | 345/157 |
| 6,570,555 B1 | 5/2003 | Prevost et al. ............... | 345/156 |
| 6,708,228 B1 * | 3/2004 | Meyers et al. .................... | 710/5 |
| 6,728,708 B1 | 4/2004 | Yotka et al. | |
| 6,954,196 B1 | 10/2005 | Lipscomb et al. ............ | 345/156 |
| 7,093,034 B2 | 8/2006 | Need | |
| 7,164,410 B2 | 1/2007 | Kupka ......................... | 345/156 |
| 2005/0104858 A1 | 5/2005 | Need et al. .................... | 345/172 |
| 2005/0132408 A1 | 6/2005 | Dahley et al. .................. | 725/80 |
| 2006/0007933 A1 | 1/2006 | Maxson et al. ............... | 370/392 |
| 2006/0026521 A1 * | 2/2006 | Hotelling et al. ............ | 715/702 |
| 2006/0041892 A1 * | 2/2006 | Need ............................ | 719/318 |
| 2006/0066571 A1 | 3/2006 | Fairs et al. .................... | 345/157 |
| 2006/0174202 A1 | 8/2006 | Bonner ........................ | 715/750 |
| 2007/0006092 A1 | 1/2007 | Makela ........................ | 715/733 |
| 2008/0136775 A1 * | 6/2008 | Conant ......................... | 345/156 |

OTHER PUBLICATIONS

International Search Report.

(Continued)

*Primary Examiner* — Srilakshmi K Kumar
*Assistant Examiner* — Jesus Hernandez
(74) *Attorney, Agent, or Firm* — Westman, Champlin & Kelly, P.A.

(57) ABSTRACT

A control system is disclosed that is configurable (e.g., by a programmer) so as to enable input from multiple sources to capture to multiple controls. Also or alternatively, the system is configurable so as to enable input from multiple sources to capture to a single control. The system also provides a consistent and extendable scheme for filtering out conflicting events for individual controls. In one embodiment, this means that the system is configurable (e.g., based on the programmer's asserted preferences) so as to enable a selective determination as to whether additional inputs can be captured for a given control.

15 Claims, 7 Drawing Sheets

OTHER PUBLICATIONS

PCT International Search Report dated Dec. 17, 2008 for Int'l Serial No. PCT/US2008/064740, filed May 23, 2008.

Written Opinion dated dated Dec. 17, 2008 for Int'l Serial No. PCT/US2008/064740, filed May 23, 2008.

Tse & Greenberg, E. & S.; Rapidly Prototyping Single Display Groupware through the SDGToolkit, Australian Computer Society, Inc., 2004, pp. 101-110.

Hourcade & Bederson, J. & B.; "Architecture and Implementation of a Java Package for Multiple Input Devices (MID)" Human-Computer Interaction Lab, U of Maryland, College Park, MD—May 22, 2007, 11 pgs.

Ballagas et al., R.; "iStuff: A Physical User Interface Toolkit for Ubiquitous Computing Environments" Papers: between U and I, Ft. Lauderdale, FL—V. 5, No. 1, Apr. 2003, pp. 537-544.

Johanson et al., B.; "PointRight: Experience with Flexible Input Redirection in Interactive Workspaces" v. 4, issue 2, USIT '02, Paris France, pp. 227-234.

First Official Chinese Office Action in related case Serial No. 200880017310.7, filed May 23, 2008, with English Translation.

Communication dated Apr. 3, 2012 from European Patent Office, 1 pgs.

* cited by examiner

SELECTIVE ENABLING OF MULTI-INPUT CONTROLS

BACKGROUND

Controls are interface elements utilized by computer programmers to build graphical user interfaces (GUIs). Different controls support different types of interaction with a user of a computer program. Some controls, such as radio buttons, check boxes, drop-down lists and toolbars support selection-type functionality. Other controls, such as tabs and scrollbars, support navigation-type functionality. Other controls, such as text boxes and combo boxes support text input functionality. Other controls, such as tooltips, progress bars and labels, support output functionality. Still other controls support window-oriented functions. In many cases, a computer programmer will have access to control toolkits that contain a collection of controls from which to choose.

Recently, devices that support simultaneous (or practically simultaneous) activation of multiple inputs by one or multiple users have been introduced. Unfortunately, current control systems are generally not configured to effectively manage this type of multiple input scheme. Many current systems are limited to single input controls, which are not particularly effective in terms of their ability to support a multi-input (e.g., multi-touch) scenario. It is common for single input controls to malfunction and/or appear to be broken under such circumstances.

For example, one can imagine an interface that incorporates a traditional scrollbar that is a composite control containing other controls such as an "UP" button, a "DOWN" button and a "THUMB" slide for dragging and scrolling. Within many multi-input systems, should one try to press the UP and DOWN buttons simultaneously, the buttons will fire up and down commands at the same time. The application is unlikely to be configured to effectively handle the conflicting events.

A reliable solution for avoiding control conflicts is to limit user input for the entire application to single inputs only. However, in these circumstances, the multi-input functionality adds no value. Thus, there is a need for a control scheme configured to effectively manage multiple inputs from one or multiple users.

The discussion above is merely provided for general background information and is not intended for use as an aid in determining the scope of the claimed subject matter.

SUMMARY

A control system is disclosed that is configurable (e.g., by a programmer) so as to enable input from multiple sources to simultaneously capture to multiple controls. Also or alternatively, the system is configurable so as to enable input from multiple sources to simultaneously capture to a single control. The system also provides a consistent and extendable scheme for filtering out conflicting events for individual controls. In one embodiment, this means that the system is configurable (e.g., based on the programmer's asserted preferences) so as to enable a selective determination as to whether additional inputs can be captured for a given control.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
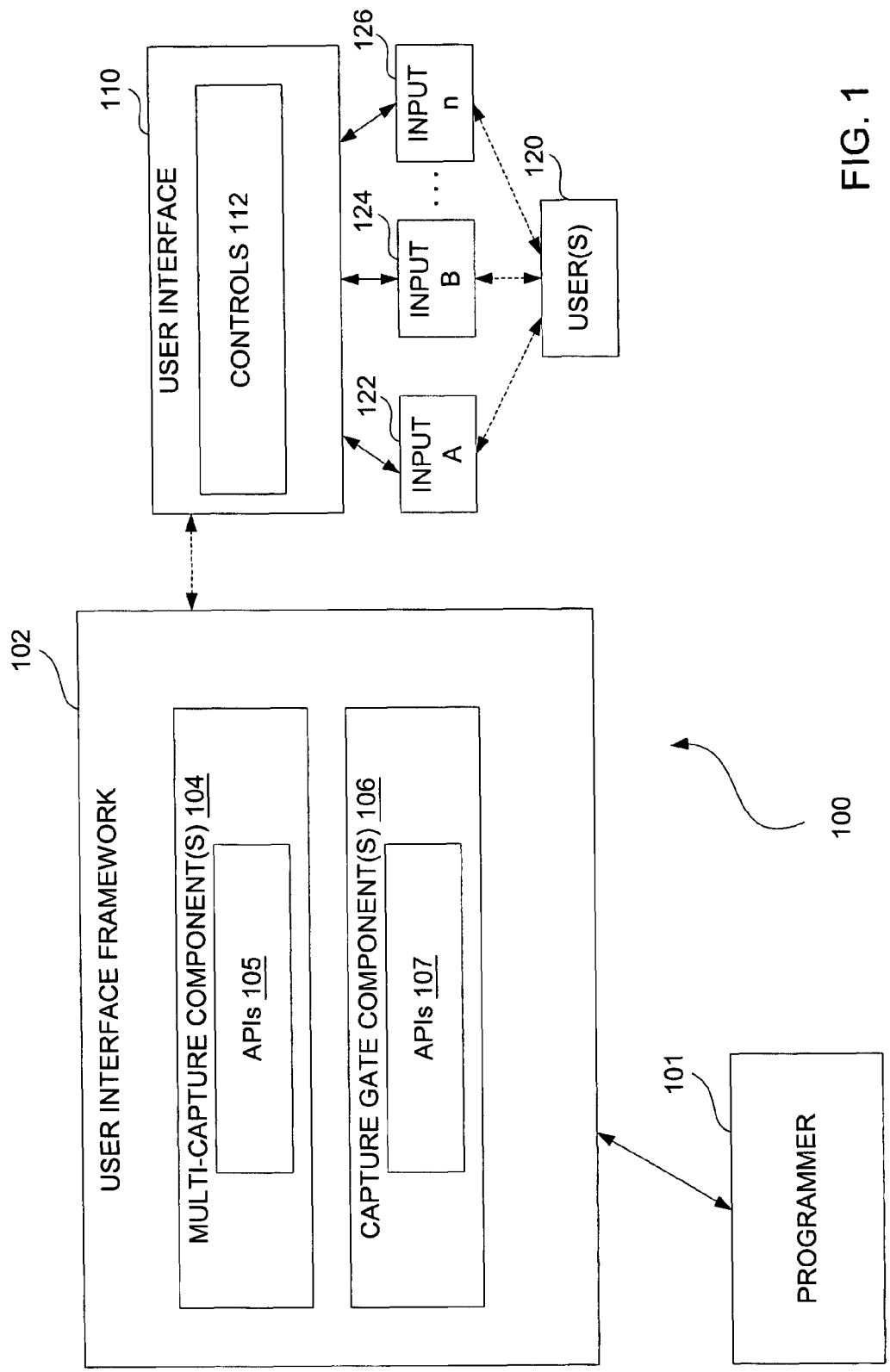
FIG. 1 is a schematic illustration of a computer programming environment.

FIG. 1 is a schematic illustration of a computer programming environment 100. Within environment 100, a programmer interacts with a user interface framework 102 in order to produce a user interface 110. Interface 110 includes a plurality of controls 112.

Within FIG. 1, a user 120 is shown as interacting with user interface 110 by way of one or more of input mechanisms 122, 124 and 126. By manipulating any or all of input mechanisms 122, 124 and 126, user 120 is able to interact with controls 112, which are created and configured by programmer 101 by way of interaction with framework 102. In one embodiment, multiple inputs can be simultaneously (or practically simultaneously) communicated from more than one of inputs 122, 124 and 126, and need not necessarily originate from just a single user. It should be noted that mechanisms 122, 124 and 126 can be any input mechanism such as, but not limited to, a mouse input mechanism, a touch screen input mechanism, a voice input mechanism, a laser pointer input mechanism, or any other mechanism that enables user 120 to communicate input. In theory, there certainly could be more than the illustrated three input mechanisms. Further, all three of inputs 122, 124 and 126 can be individual inputs originating from a single input mechanism (e.g., multiple simultaneous inputs to a single touch screen mechanism).

It should be noted that use of the term "simultaneous" herein should not be construed as strictly simultaneous. Conflicts are contemplated with any period of time between inputs, for example, within a few seconds, milliseconds, or within other suitable and/or configurable time periods.

Framework 102 illustratively includes multi-capture components 104 and capture gate components 106. Components 104 and 106, including corresponding application program interfaces (APIs) 105 and 107, support extensions of the functionality of framework 102 to accommodate specialized support for multi-input controls. Multi-capture components 104 illustratively enable a control 112 to capture input from multiple input mechanisms (e.g., one or more of mechanisms 122, 124 and/or 126) and to redirect all events from that device(s) to the control. Alternatively or in addition, multi-capture components 104 enable multiple controls 112 to capture input from multiple input mechanisms (e.g., simultaneous inputs from multiple input mechanisms) and to distribute events from the devices to appropriate controls. Capture gate components 106 provide an organized way for programmer 101 to filter out conflicting events. In one embodiment, components 106 illustratively enable programmer 101 to define control specific logic that limits user input so as to avoid conflicting situations for a particular control.

Before turning to a more detailed description of the functionality of components 104 and 106 within user framework 102, it is worth at least first diverting to a brief overview of current techniques for implementing single-input controls. In a typical scenario, a user interface framework will provide a way to redirect input to a particular control through a method of first capturing an input device and then binding it to a corresponding user interface element (i.e., a corresponding control). Thus, when the input device is captured, an input pipeline redirects input from that device to the capturing control ignoring where the actual position of that device is during the captured time period (e.g., ignoring where a cursor is placed once the mouse has been captured).

An example of a traditional single input scenario can be found in a typical painting application that supports interaction with a mouse input device. When the user is about to "paint" on a depiction of a canvas, he or she moves the cursor over the canvas and initiates a "mouse down" event, for example by pressing and holding a mouse button. Upon the mouse down event, the application captures the mouse device to the canvas control. This capture is terminated upon a user-initiated release in the form of a "mouse up" event, for example by releasing the held down mouse button. During the captured time period, all mouse events (cursor movement, etc.) are forwarded to the canvas control even when the cursor position is outside of the canvas area (e.g., over a toolbar user interface element).

Components 104 illustratively extend the traditional approach by treating all pointer-like devices (including "touch") as independent physical or virtual devices and allowing a control library (or an application) to capture any of those devices independently. Thus, in one embodiment, a control is configured to be multi-touch-aware such that it will capture any contact that happens over it and will route all corresponding subsequent events to the control.

In one embodiment, but not necessarily, framework 102 is configured to impose a restriction so as to limit the capture of an input device to a single control. Such a restriction may avoid potential ambiguity. However, it is certainly contemplated for a single control to be configurable to capture multiple input devices. In one embodiment, framework 102 is configured to raise "GotCapture" and "LostCapture" events as acknowledgement that a capture has succeeded or has been released. In one embodiment, when a device is disconnected (e.g., when a finger leaves a touch-device, when the mouse button is released, etc.), framework 102 is configured to release the capture automatically.

Figure 2:
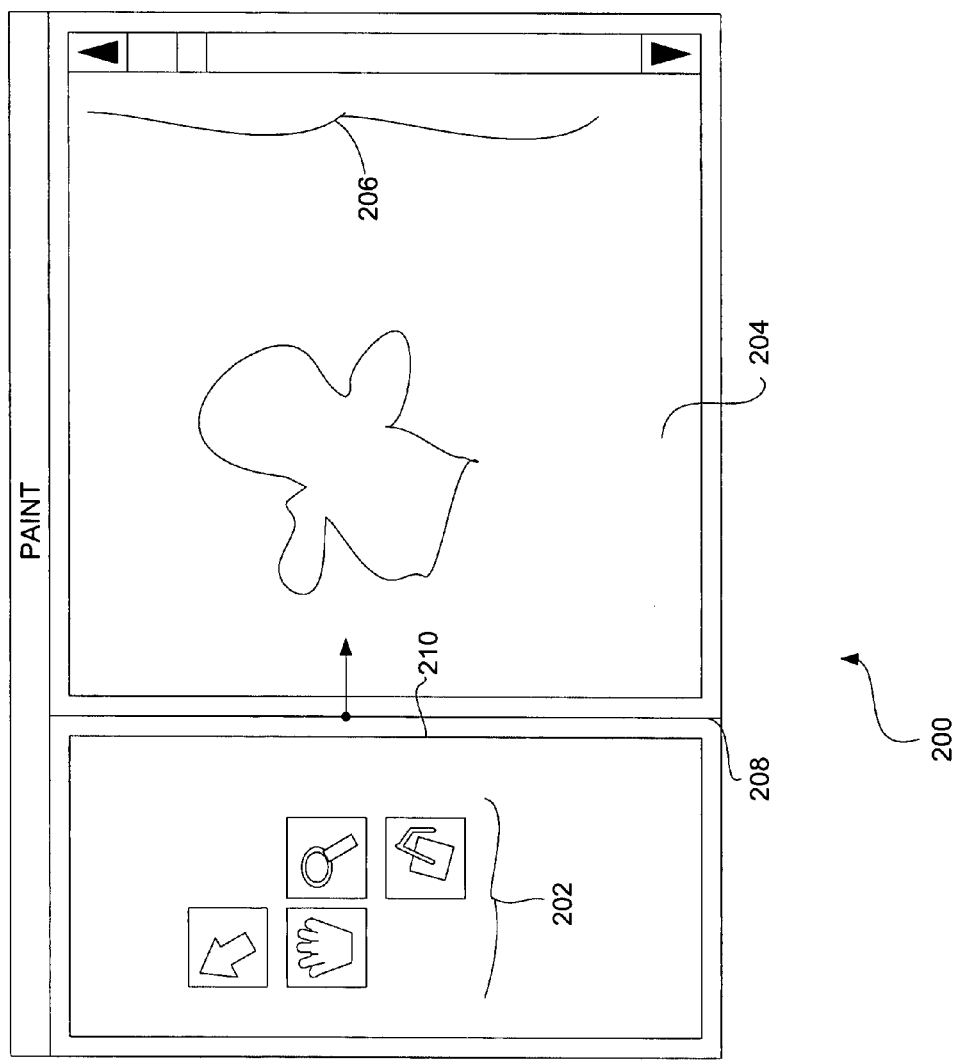
FIG. 2 is a depiction of an example user interface.

Components 106 illustratively support a filtering out of conflicting events. In order to provide context for the description of this functionality, an example will be provided. FIG. 2 is a depiction of an example user interface 200. Interface 200 is illustratively part of a painting application that enables a user to create a drawing in a pallet area 204. A group of buttons 202 enables the user to switch between different functions (e.g., paintbrush, eraser, magnifying glass, etc.) (an illustrative four different buttons 202 are shown in FIG. 2). A scroll bar 206 enables the user to move the pallet area up and down as desired. A splitter 208 divides a left side of the interface from a right side. Those skilled in the art are likely to be familiar with applications having interfaces substantially similar to interface 200.

Figure 3:
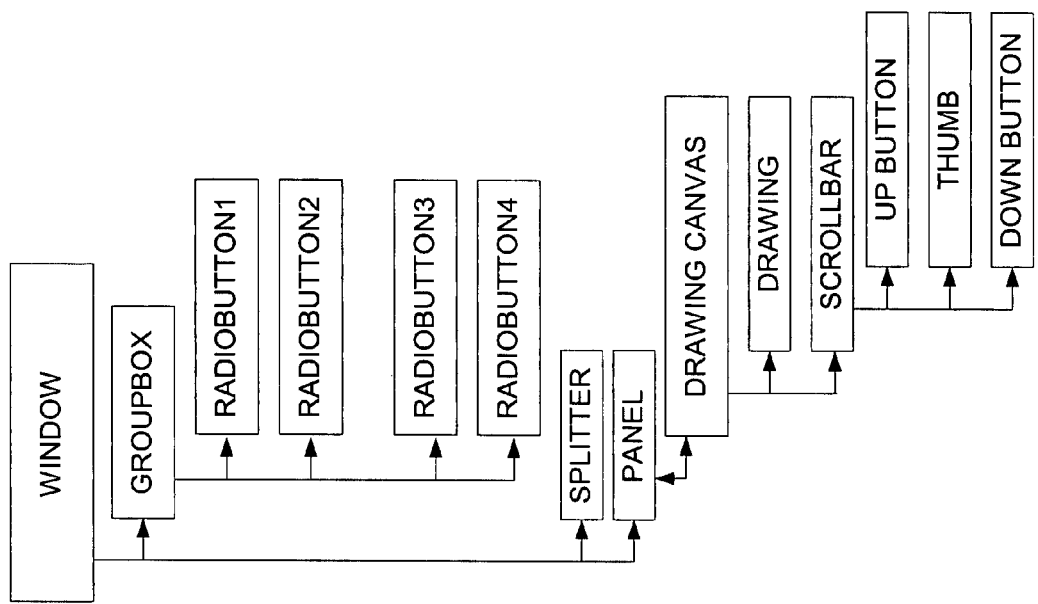
FIG. 3 is a tree representation of user interface elements associated with the example user interface.

FIG. 3 is a tree representation of exemplary elements (e.g., controls, etc.) of interface 200. It is illustratively true that some of the elements shown in FIG. 3 can be operated simultaneously by multiple devices (or multiple touches) but some may not. For example, for the purpose of illustration, it will be assumed that the functionality of elements of interface 200 is most desirable if configured to support interaction based on the following principles:

1. Each of buttons 202 can only be activated by a single input (e.g., pressed by a single touch). This makes button behavior relatively clean.
2. Buttons 202 are essentially "tool selectors" and, assuming the paint application has a limitation to support only one active tool at a time, then it makes sense to limit input for the GroupBox 210 containing those buttons to a single input only.
3. Splitter 208 is illustratively an element that can be dragged by a user to resize left and right panels. It makes sense to limit it to manipulation through only a single input as well.
4. ScrollBar 206 should accept a single input only to avoid conflicting actions such as pressing Up and Down and/or dragging the Thumb slider.
5. The Up and Down buttons inside the scrollbar, as well as the Thumb slider, can be set up to work with a single input each. Also, given that these elements are parts of a composite control (Scrollbar), the broader ScrollBar illustratively adds another limitation to avoid pressing Up and Down and dragging the Thumb slider at the same time.
6. The rest the controls associated with interface 200 illustratively can accept multiple inputs. For example, a user can select a tool with one hand while, with another hand, can continue drawing with multiple fingers in canvas area 204.

In one embodiment, capture gate components 106 enable programmer 101 to specify how various controls manage multiple inputs. Components 106 illustratively provide an abstract class "CaptureGate" with at least two operations, namely: 1) Try to Acquire; and 2) Release. Programmer 101, through interaction with framework 102, can leverage the CaptureGate functionality in order to enable appropriate implementation for a given control.

In one embodiment, capture gate components 106 extend framework 102 by providing support that enables CaptureGate to be set in association with a particular user interface element. Further, in one embodiment, components 106 are configured to find the top most CaptureGate (along the parent chain) for a particular element.

Those skilled in the art will appreciate that the details as to how capture gate functionality is integrated into a given user interface framework will vary based on the implementation details associated with a given framework. In other words, the details of capture gate implementation is likely to be framework specific. As an example, the Windows Presentation Foundation (WPF), a graphical subsystem associated with products offered by Microsoft Corporation of Redmond, Wash., provides support for the ability to define an attached property that can be set and retrieved on any user interface element in the visual tree. In this case, CaptureGate can be implemented as a value of an attached property. This is but one example of implementation within a specific framework.

Typically, a user interface framework exposes support for the ability to manipulate capture through Capture( ) and Release( ) methods. In one embodiment capture gate components 106 extend those methods with a capability to find the top most CaptureGate and to try to acquire it. An error is illustratively returned if the Acquire fails (e.g., for the Capture( )). In addition, components 106 are configured to find the top most CaptureGate and Release it (e.g., for the Release( )).

Still further, in one embodiment, at the framework level, capture gate components 106 illustratively provide implementation for specialized CaptureGates having specialized functionality. For example, a SingleCaptureGate illustratively limits acquisition to a single device only. The SingleCaptureGate is essentially a specialization of the abstract CaptureGate class. Capture gate components 106 illustratively empower a control author with an ability to choose to implement another CaptureGate with the same interface (Acquire and Release) to provide any behavior. For example, if a button requires that it should be pressed by N simultaneous contacts, the control author can provide a CaptureGate that allows N inputs at the same time and filters out the rest. Those skilled in the art will appreciate that the example specialization provided herein are just several of many examples of CaptureGate customizations within the scope of the present invention.

Figure 4:
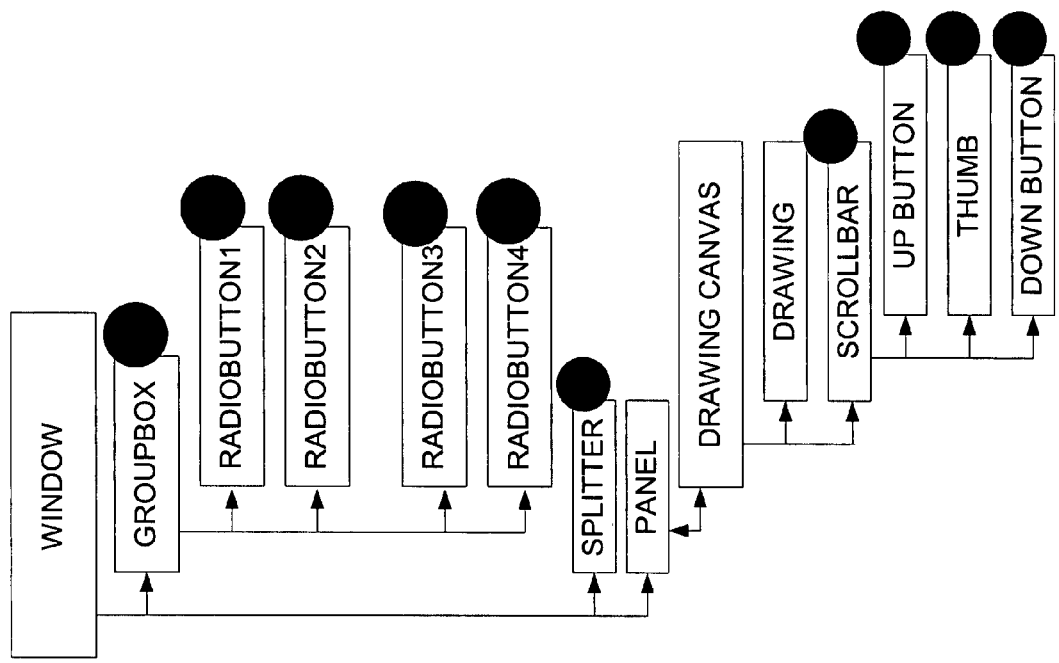
FIG. 4 is the tree representation with certain user interface elements marked with a CaptureGate function that filters out unsupported inputs.

Accordingly, in one embodiment, support is provided to enable an author of a control class (e.g., programmer 101) to designate the class as "single input only" by setting CaptureGate on the control UI element. For the example above, all RadioButtons, Up and Down buttons may have SingleCaptureGate set on them in the Button constructor. When the button (or any control) tries to capture the input, the capture method will automatically find the top most CaptureGate (for the RadioButton1, GroupBox will be used as a source of the CaptureGate) and try to acquire it. In one embodiment, if the Capture returns a false indication, then the control will ignore the input from that device and subsequent events from it. Continuing the example of FIGS. 2 and 3, FIG. 4 shows certain user interface elements marked with CaptureGate (indicated by dark circles) so as to filter out unsupported inputs.

In one embodiment, an API 107 that exposes CaptureGate is in the nature of:

```
Public abstract class CaptureGate
{
    protected virtual bool TryAcquire(InputDevice, UIElement);
    protected virtual void Release(InputDevice);
    public static void SetCaptureGate(UIElement, CaptureGate);
}
```

In one embodiment, the other methods described herein are internal for the user interface framework and are indirectly called, for example, through Capture( ) and Release( ), which most user interface frameworks provide. All this being said, those skilled in the art will appreciate that other implementation schemes are also within the scope of the present invention.

Figure 5:
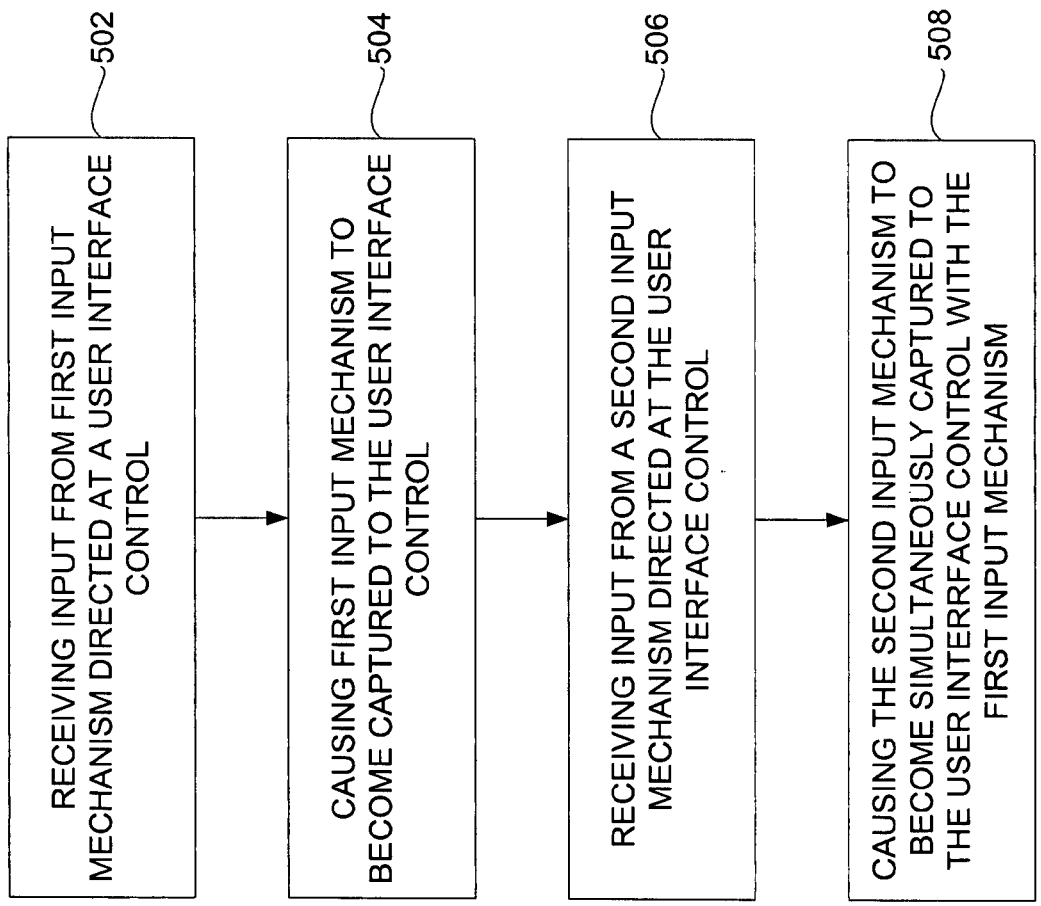
FIG. 5 is a block flow diagram demonstrating a method for managing inputs in accordance with a multi-captured scenario.

FIG. 5 is a block flow diagram demonstrating one embodiment of a method 500 for managing inputs in accordance with a multi-captured scenario consistent with multi-capture functionality as described herein. In accordance with block 502, input is received from a first input mechanism, the input being directed at a user interface control. In accordance with block 504, the first input mechanism is captured to the user interface control. In accordance with block 506, input is received from a second input mechanism, the input also being directed at the user interface control. In accordance with block 508, the second input mechanism is captured to the user interface control simultaneously with the first input mechanism.

Figure 6:
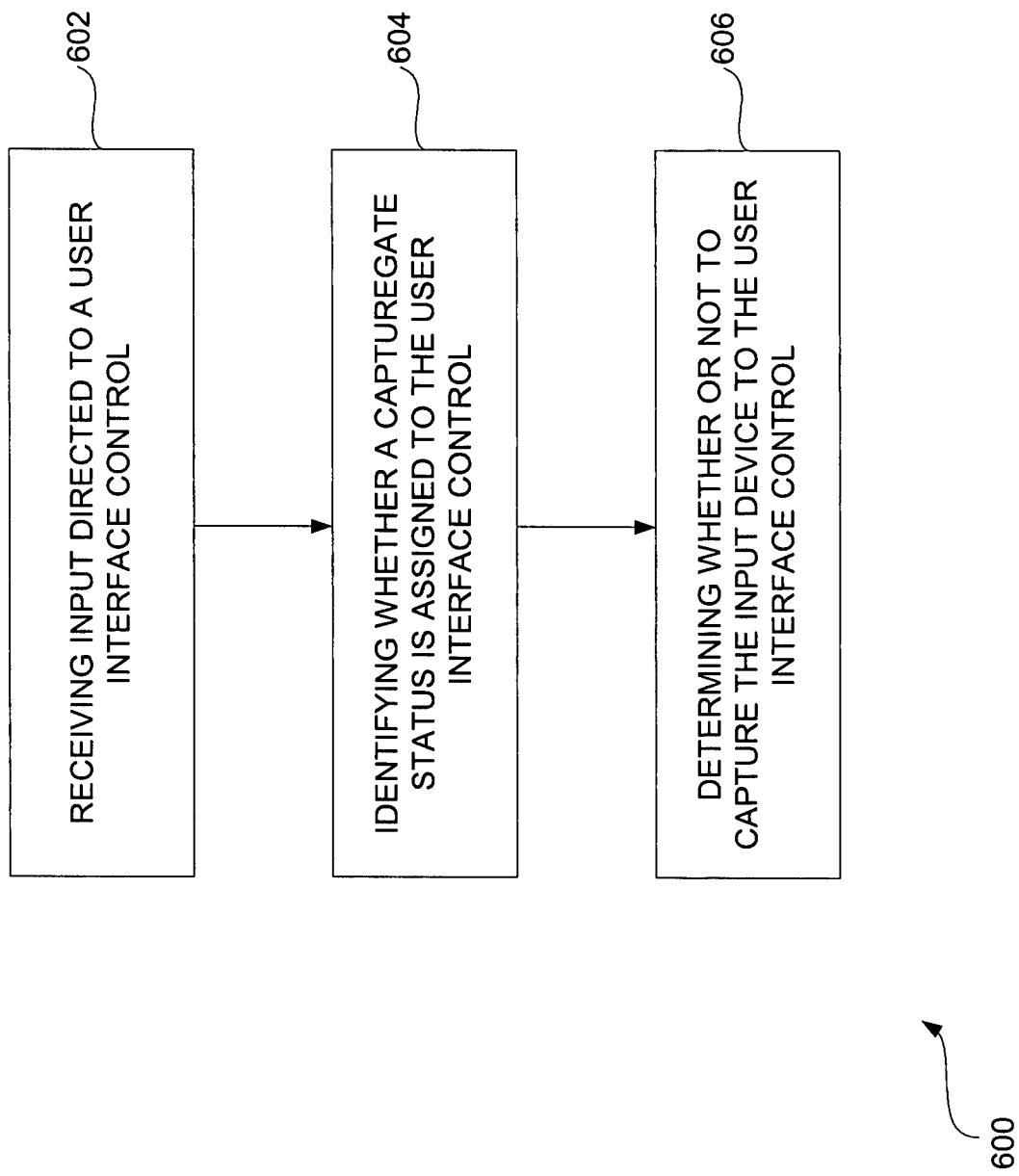
FIG. 6 is a block flow diagram demonstrating a method for managing inputs in accordance with a capture gate scenario.

FIG. 6 is a block flow diagram demonstrating one embodiment of a method 600 for managing inputs in accordance with capture gate functionality as described herein. In accordance with block 602, an input is received from an input mechanism. The input is directed to a user interface control. In accordance with block 604, a determination is made as to whether a CaptureGate status has been assigned to the user interface control. Finally, in accordance with block 606, based for example on the previous determination, the input mechanism is or is not captured to the user interface control. Of course, part of this final determination may depend on whether or not one or more different input mechanisms are already captured to the user interface control, and may also depend on parameters associated with the applicable Capture Gate status.

Figure 7:
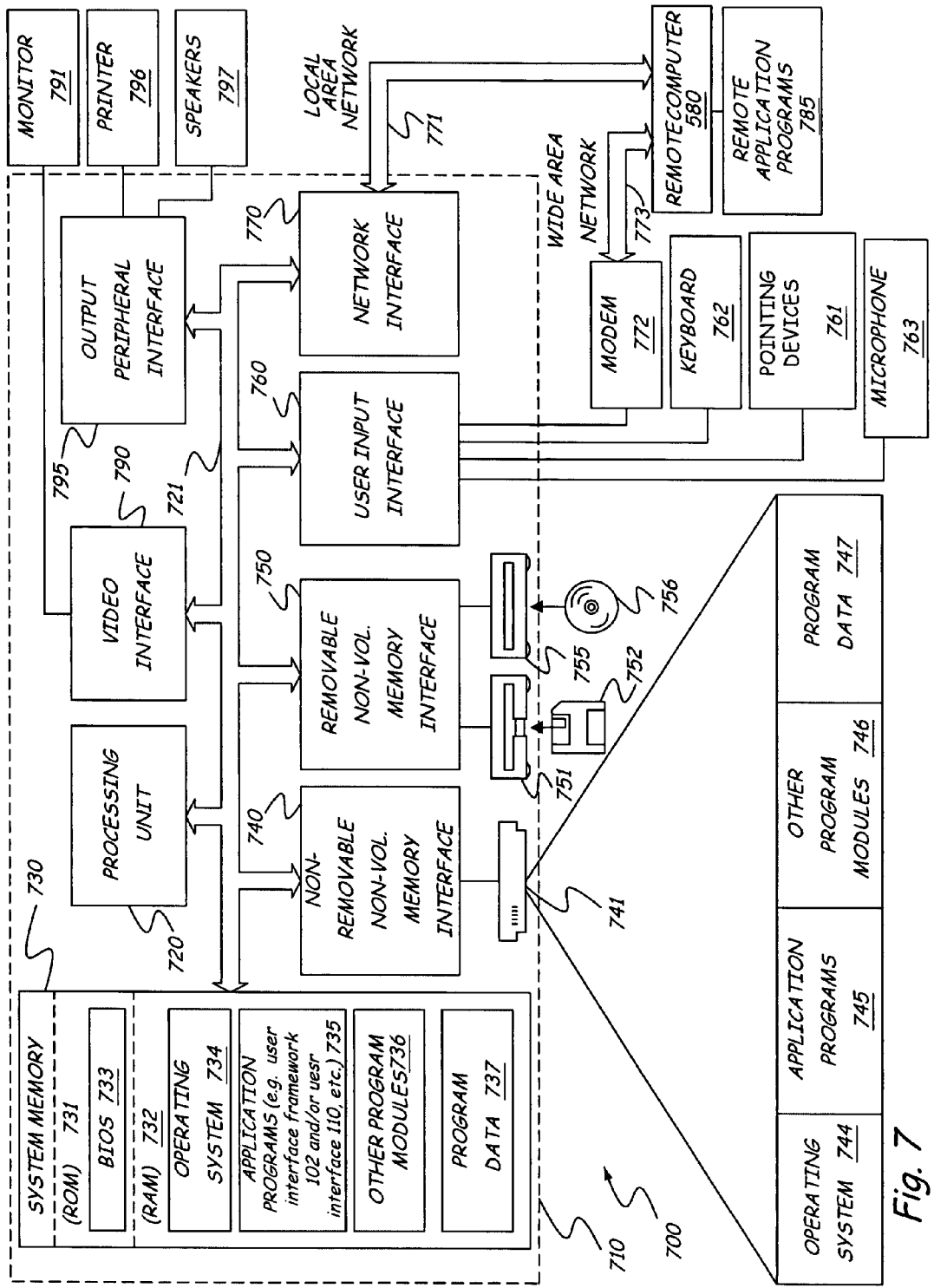
FIG. 7 is a schematic depiction of a computing system environment.

FIG. 7 illustrates an example of a suitable computing system environment 700 in which the embodiments may be implemented. The computing system environment 700 is only one example of a suitable computing environment and is not intended to suggest any limitation as to scope of use or functionality. Neither should the computing environment 700 be interpreted as having any dependency or requirement relating to any one or combination of components illustrated in the exemplary operating environment 700.

The embodiments are operational with numerous other general purpose or special purpose computing system environments or configurations. Examples of well known computing systems, environments, and/or configurations that may be suitable for use with embodiments disclosed herein include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of a computer readable medium.

The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the embodiments include a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. Programs 735 are shown as possibly including one or more components of a user interface development environment 100, embodiments of which are described herein in detail. This is but one example of where such components might be implemented. Other implementations (e.g., as part of programs 745, operating system 734 or programs 785) should also be considered within the scope of the present invention.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of managing touch screen inputs, the method comprising:
   receiving a plurality of simultaneous touch screen inputs directed to a graphically rendered user interface element having an underlying, functionally connected first user interface control;
   receiving an additional simultaneous touch screen input that is also directed to the user interface element;
   identifying a first capture status that is assigned to the first user interface control;
   identifying a second capture status that is assigned to a second user interface control;
   utilizing a visual tree to determine whether or not the first user interface control and the second user interface control are related through a hierarchical relationship;
   utilizing, based on a determination that the first and the second user interface controls are related, the identified first capture status and the identified second capture status to determine a maximum number of simultaneous touch screen inputs that can be captured to the user interface element;
   capturing the plurality of simultaneous touch screen inputs to the user interface control based on a determination that the plurality of simultaneous touch screen inputs is less than or equal to the maximum number of simultaneous touch screen inputs; and
   filtering out the additional simultaneous touch screen input based on a determination that the additional simultaneous touch screen input exceeds the maximum number of simultaneous touch screen inputs.

2. The method of claim 1, and further comprising:
   routing subsequent events from the plurality of simultaneous touch screen inputs to the first user interface control until a lost capture event is raised and acknowledged.

3. The method of claim 2, wherein the lost capture event is automatically raised and acknowledged based at least in part upon a finger leaving a touch-device.

4. The method of claim 1, wherein identifying the first capture status and the second capture status comprises evaluating states of capture components that are each switchable between a captured state and a released state.

5. The method of claim 1, wherein the first capture status and the second capture status are values of attached properties, and wherein identifying the first capture status and the second capture status comprises identifying the values of the attached properties.

6. The method of claim 1, wherein the first capture status and the second capture status are exposed to a user interface framework utilizing an application programming interface.

7. A touch screen development system, comprising:
   a user interface having a plurality of graphically rendered control elements;
   a plurality of different input mechanisms;
   a visual tree that hierarchically arranges the plurality of graphically rendered control elements into multiple levels;
   a capture gate management component that enables a programmer to associate one of a plurality of different capture gate statuses to each of the graphically rendered control elements, the plurality of different capture gate statuses including a first capture gate status that limits acquisition of one of the plurality of graphically rendered control elements to a single input, and a second capture gate status that requires acquisition of another one of the plurality of graphically rendered control elements by a plurality of simultaneous inputs; and
   a computer processor that configures each of the plurality of graphically rendered control elements to accept or reject one or more of a plurality of inputs from the plurality of different input mechanisms depending upon the capture gate status of the control and upon the capture gate statuses of a portion of the plurality of graphically rendered control elements that are above the control in the hierarchy.

8. The system of claim 7, wherein the capture gate management component enables the programmer to collectively associate each of the first capture gate status and the second capture gate status with more than one of the plurality of graphically rendered control elements.

9. The system of claim 7, wherein the capture gate management component enables the programmer to collectively associate each of the first capture gate status and the second capture gate status with one of the multiple levels.

10. The system of claim 9, wherein the capture gate management component enables the programmer to collectively associate each of the first capture gate status and the second capture gate status with the one of the multiple levels by assigning a single capture gate status to a top level of the multiple levels.

11. The system of claim 7, wherein each of the plurality of graphically rendered control elements is displayed in the visual tree.

12. The system of claim 7, wherein association of each of the first capture gate status and the second capture gate status exposes capture and release methods.

13. The system of claim 12, wherein the association of each of the first capture gate status and the second capture gate status allows a certain number of inputs and excludes inputs beyond the certain number.

14. The method of claim 2, wherein utilizing the visual tree comprises evaluating user interface controls at a plurality of different hierarchical levels.

15. The method of claim 14, wherein the plurality of different hierarchical levels comprises at least four levels.

* * * * *